(12) United States Patent
Irizarry

(10) Patent No.: US 10,876,714 B2
(45) Date of Patent: *Dec. 29, 2020

(54) FLAT PANEL LUMINAIRE WITH INTEGRATED ELECTRONIC DEVICES

(71) Applicant: Signify Holding B.V., Amsterdam (NL)

(72) Inventor: Andre J. Irizarry, Atlanta, GA (US)

(73) Assignee: SIGNIFY HOLDING B. V., Eindhoven (NL)

(*) Notice: Subject to any disclaimer, the term of this patent is extended or adjusted under 35 U.S.C. 154(b) by 0 days.

This patent is subject to a terminal disclaimer.

(21) Appl. No.: 16/819,917

(22) Filed: Mar. 16, 2020

(65) Prior Publication Data

US 2020/0217483 A1    Jul. 9, 2020

Related U.S. Application Data

(63) Continuation of application No. 16/215,264, filed on Dec. 10, 2018, now Pat. No. 10,605,436.

(51) Int. Cl.
| | | |
|---|---|---|
| *F21V 15/01* | (2006.01) | |
| *F21V 8/00* | (2006.01) | |
| *F21V 23/02* | (2006.01) | |
| *F21V 23/00* | (2015.01) | |
| *F21V 23/04* | (2006.01) | |
| *F21V 17/12* | (2006.01) | |

(52) U.S. Cl.
CPC ............ *F21V 15/01* (2013.01); *F21V 17/12* (2013.01); *F21V 23/003* (2013.01); *F21V 23/02* (2013.01); *F21V 23/0442* (2013.01); *G02B 6/0036* (2013.01); *G02B 6/0051* (2013.01); *G02B 6/0055* (2013.01); *G02B 6/0088* (2013.01)

(58) Field of Classification Search
CPC ..... F21V 15/01; G02B 6/0081; G02B 6/0086; G02B 6/0088; G02B 6/0091; G02B 6/0093
See application file for complete search history.

(56) References Cited

U.S. PATENT DOCUMENTS

| | | |
|---|---|---|
| 8,096,671 B1 | 1/2012 | Cronk |
| 9,470,382 B1 | 10/2016 | Sharrah |
| 10,018,343 B2 | 7/2018 | Wasserman |
| 10,344,954 B1 | 7/2019 | Tischler |

(Continued)

FOREIGN PATENT DOCUMENTS

| | | |
|---|---|---|
| EP | 2924354 | 9/2015 |
| WO | WO 02101284 | 12/2002 |

OTHER PUBLICATIONS

Light Up. Jul. 2016. https://www.lightup.com/2ftx2ftbuiltinemergencyflatpannelled17wbackup35wattdimmable4550lumens.htmlv.

(Continued)

*Primary Examiner* — Alexander K Garlen

(57) ABSTRACT

A luminaire includes a housing assembly that has a back plate embossed to allow one or more power supply devices to be coupled thereto and to be integrated into the luminaire. Further, the luminaire includes a light assembly that is disposed in an internal cavity defined by the housing assembly. The light assembly includes a light source and an optical assembly. The optical assembly includes a light guide and a reflector layer. Furthermore, the luminaire includes an electronic control device mounting apparatus that is configured to integrate an electronic control device into the luminaire through the optical assembly.

20 Claims, 15 Drawing Sheets

(56) References Cited

U.S. PATENT DOCUMENTS

| | | |
|---|---|---|
| 2002/0141181 A1 | 10/2002 | Bailey |
| 2012/0176784 A1 | 7/2012 | Peifer |
| 2012/0320627 A1 | 12/2012 | Araki |
| 2013/0003360 A1 | 1/2013 | Igaki |
| 2014/0307471 A1 | 10/2014 | Yokosawa |
| 2015/0338084 A1 | 11/2015 | Ryder |
| 2019/0170341 A1 | 6/2019 | Lax |

OTHER PUBLICATIONS

LED Panel Light PIR Motion Sensor for Day/Night Body Detector Ceiling Surface Mounted Lights. Dec. 17, 2017. https://www.amazon.com/DetectorCeilingCorridorBathroomChildren/dp/B073GXYB6G.

High Performance Hot Sale Flat Panel 15W SMD2835 Round Panel Light for Home Hotel. Alibaba.com. Nov. 2017. https://wholesaler.alibaba.com/product-detail/High-performance-hot-sale-flat-panel_60831386525.html?spm=a2700.7782932.0.0.7adele7aqHJySz.

FLAT PANEL LUMINAIRE WITH INTEGRATED ELECTRONIC DEVICES

RELATED APPLICATIONS

The present application is a continuation application of and claims priority to U.S. patent application Ser. No. 16/215,264 filed Dec. 10, 2018 and titled "Flat Panel Luminaire With Integrated Electronic Devices," the entire content of which is incorporated herein by reference.

TECHNICAL FIELD

The present disclosure relates generally to lighting solutions, and more particularly to an edge-lit light guide based flat panel luminaire with integrated electronic devices.

BACKGROUND

The operation of luminaries, such as flat panel luminaries can be made efficient and smarter by using various electronic devices, such as sensors, emergency test switches, emergency battery packs, customized drivers, etc. However, integrating one or more said electronic devices to the luminaire may require making substantial tooling changes and/or substantial changes to the luminaire housing which may result in increased complexity of manufacture, increased thickness of the luminaire, and increased cost.

It is noted that this background information is provided to reveal information believed by the applicant to be of possible relevance to the present disclosure. No admission is necessarily intended, nor should be construed, that any of the preceding information constitutes prior art against the present disclosure.

SUMMARY

In one aspect, the present disclosure relates to a luminaire that includes a housing assembly. The housing assembly includes a front frame and a back plate that is coupled to the front frame. The back plate comprises a raised portion. Further, the luminaire includes a lighting assembly disposed in an internal cavity of the housing assembly. The lighting assembly comprises a light source and an optical assembly that are arranged such that light from the light source enters a light guide of the optical assembly through a side edge of the light guide and exits the light guide through a major surface of the light guide. The major surface of the light guide is substantially perpendicular to the side edge of the light guide. Furthermore, the luminaire includes an electronic power supply device that is integrated into the luminaire by coupling the electronic power supply device to the raised portion of the back plate. Additionally, in said aspect, the luminaire includes an electronic control device that is integrated into the luminaire through the optical assembly.

In another aspect, the present disclosure relates to a luminaire that includes a housing assembly that has a back plate that is embossed to allow one or more electronic power supply devices to be coupled thereto. Further, the luminaire includes a light assembly that is disposed in an internal cavity of the housing assembly. The light assembly comprises a light source and an optical assembly. Furthermore, the luminaire includes an electronic control device mounting apparatus that is configured to integrate an electronic control device into the luminaire through the optical assembly.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
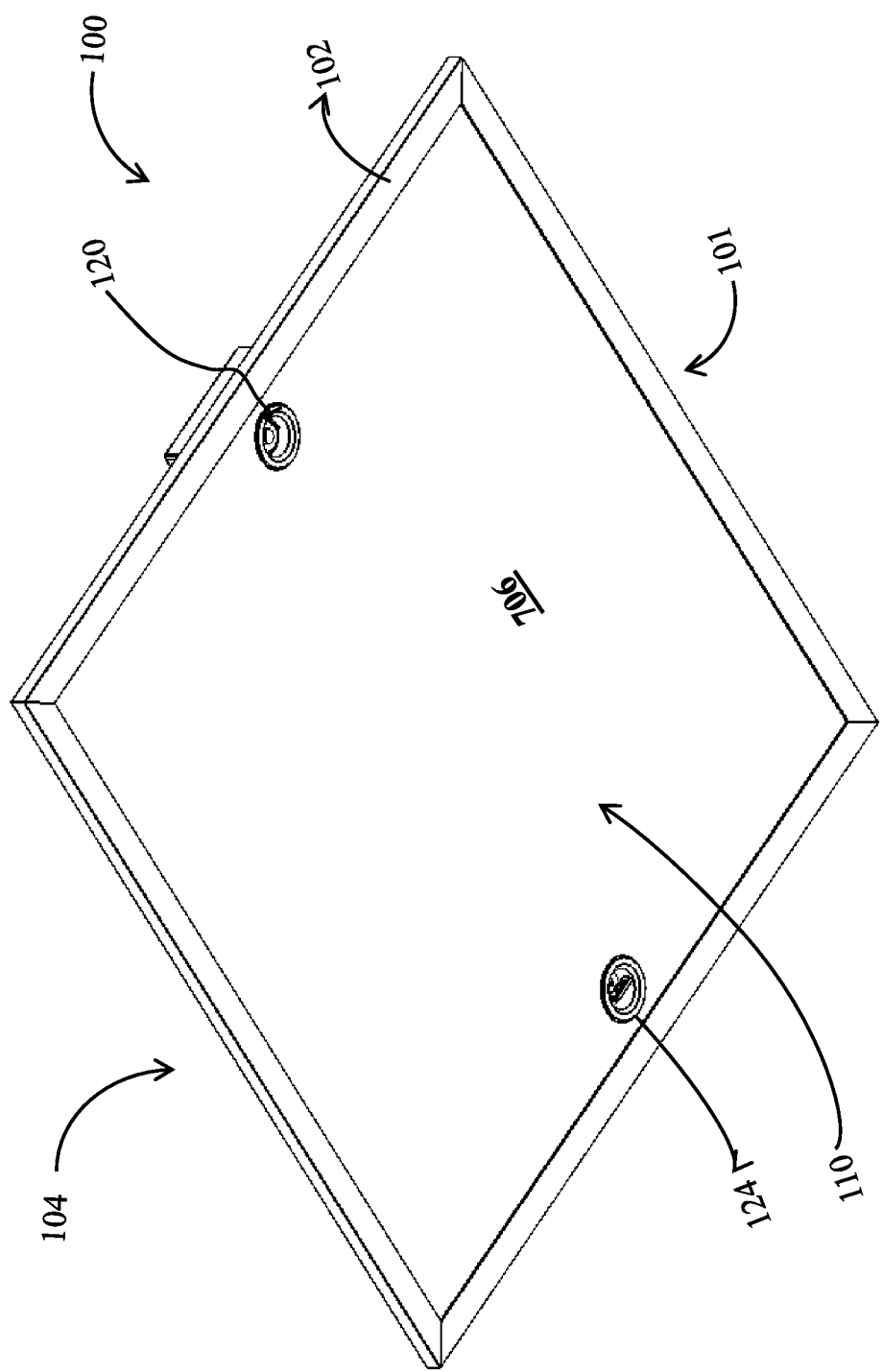
FIGS. 1-2 illustrate a bottom perspective view and a top perspective view of a first example flat panel luminaire, respectively, in accordance with example embodiments of the present disclosure.
Figure 2:
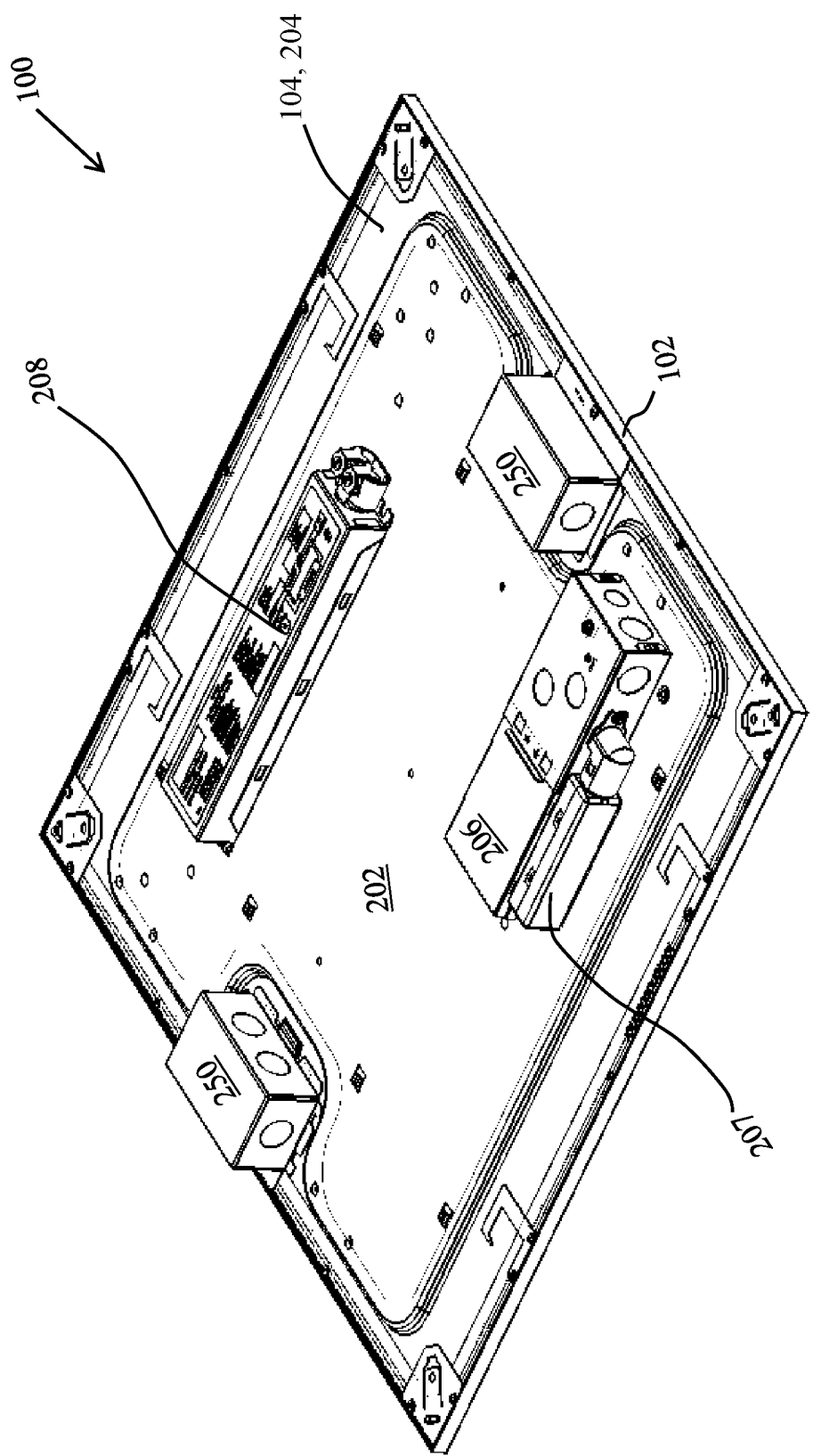
Figure 3:
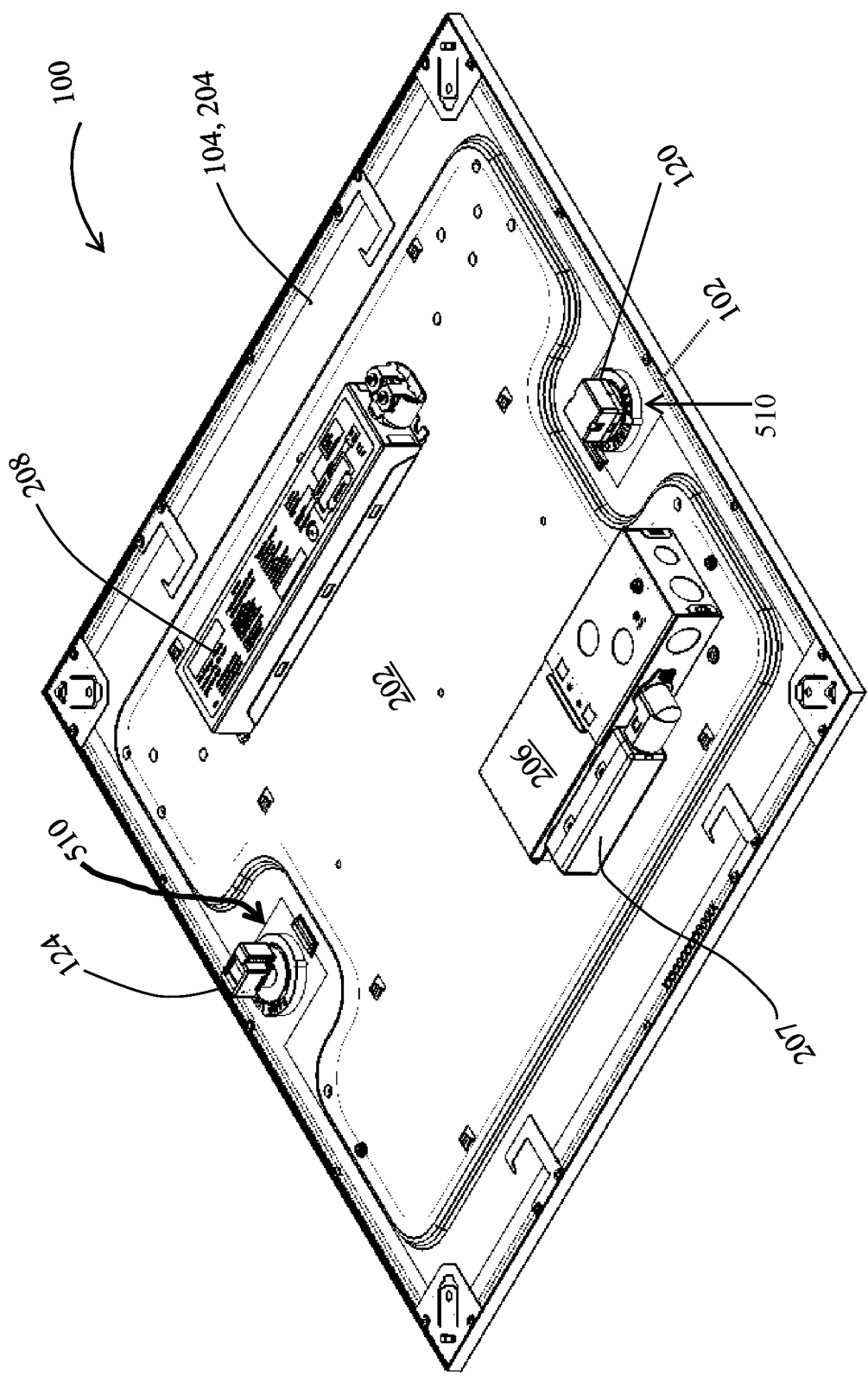
FIG. 3 illustrates the top perspective view of the first example flat panel luminaire of FIG. 1 without wire routing covers disposed over the sensor and the emergency test switch, in accordance with example embodiments of the present disclosure.
Figure 4:
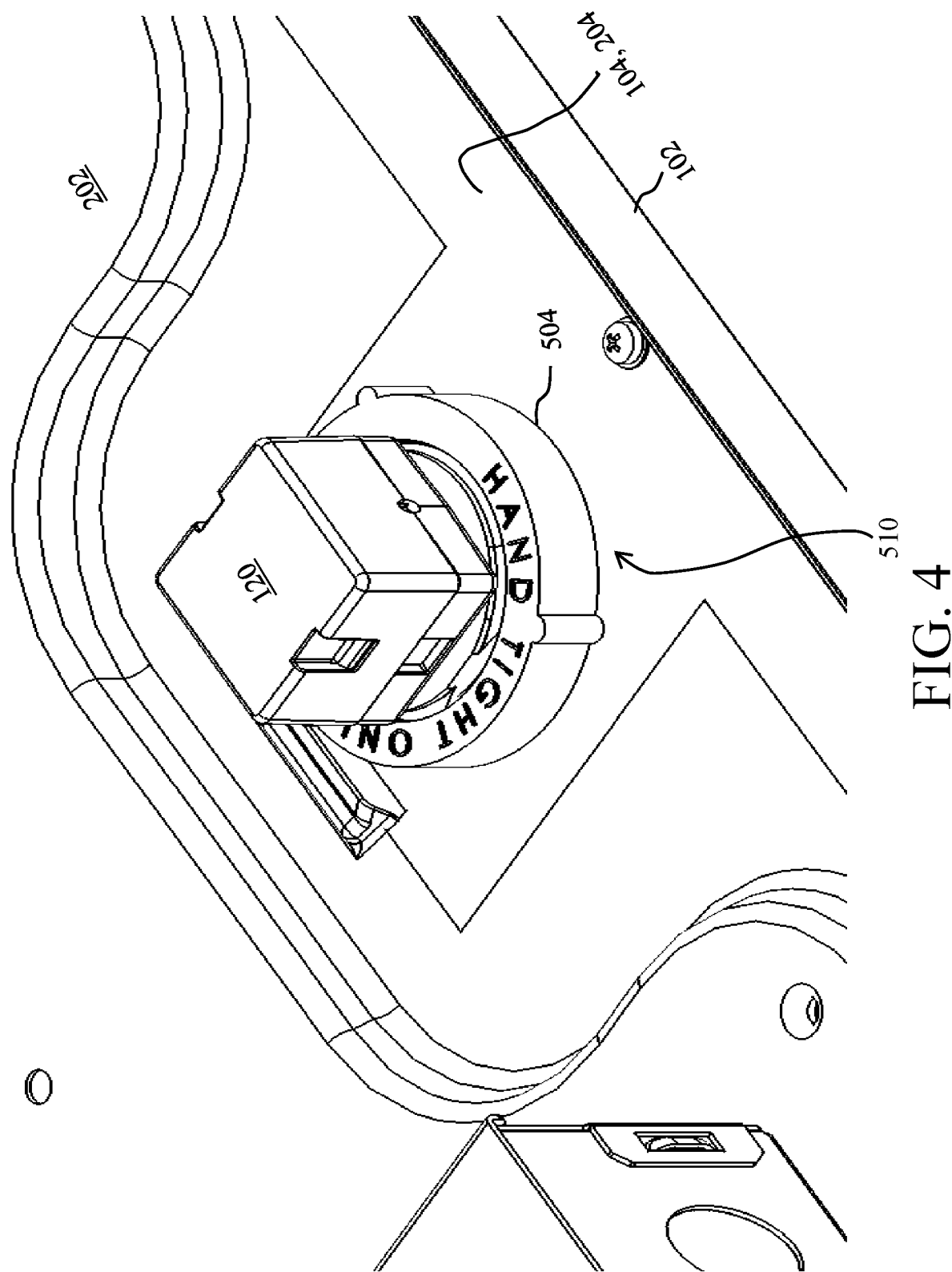
FIG. 4 illustrates an enlarged view of a portion of the top perspective view of the first example flat panel luminaire of FIG. 3, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

In the foregoing figures showing example embodiments, one or more of the components shown may be omitted, repeated, and/or substituted. Accordingly, the example embodiments of flat panel luminaries with the integrated electronic devices should not be considered limited to the specific arrangements of components shown in any of the figures. For example, features shown in one or more figures or described with respect to one embodiment can be applied to another embodiment associated with a different figure or description.

DETAILED DESCRIPTION OF EXAMPLE EMBODIMENTS

The present disclosure describes flat panel luminaries with integrated electronic devices. An example flat panel luminaire of the present disclosure includes a back plate, where at least a portion of the back plate is embossed to allow electronic devices, such as various drivers and emergency power options to be integrated into the flat panel luminaire without the need for additional parts. Further, other electronic devices, such as sensors and emergency test switches are integrated into the example flat panel luminaire through the optics of the flat panel luminaire rather than the luminaire housing or frame. The sensors and/or emergency test switches may be integrated into the optics of the luminaire using an appropriate sensor mounting apparatus.

Example embodiments of the flat panel luminaire with integrated electronic devices will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Figure 12:
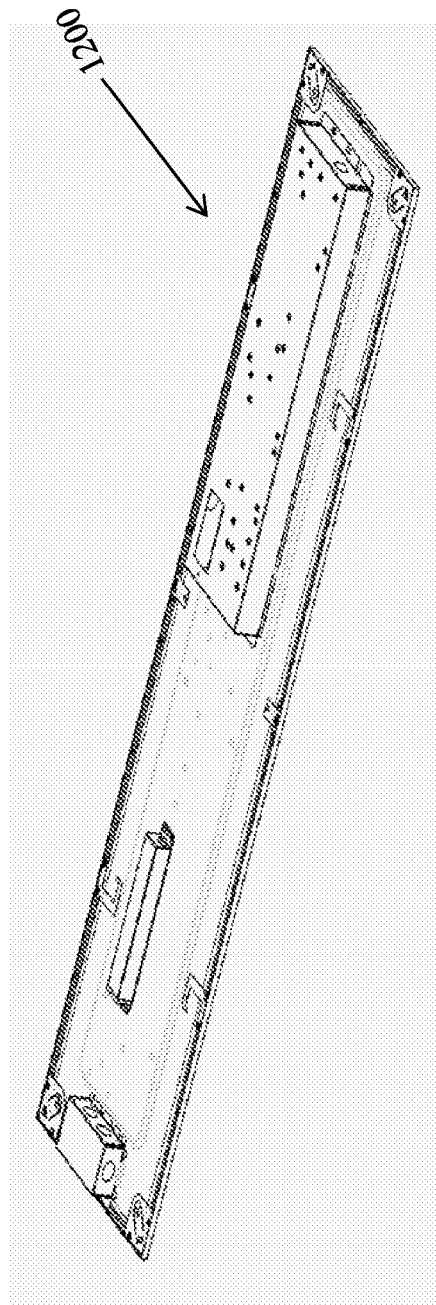
FIG. 12 illustrates a top perspective view of a third example flat panel luminaire, in accordance with example embodiments of the present disclosure.
Figure 13:
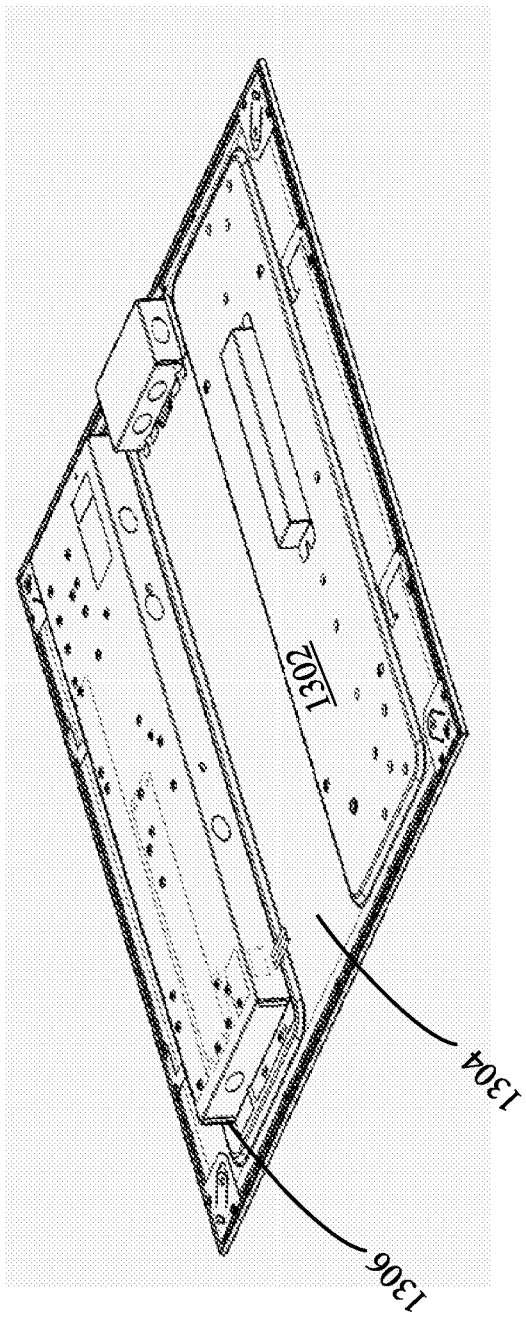
FIG. 13 illustrates a top perspective view of a fourth example flat panel luminaire, in accordance with example embodiments of the present disclosure.

Turning now to the figures, an example embodiment of a first flat panel luminaire will be described in connection with FIGS. 1-9, an example embodiment of a second flat panel luminaire will be described in connection with FIGS. 10-11 by making reference back to FIGS. 1-9, an example embodiment of a third flat panel luminaire will be described in connection with FIG. 12 by making reference back to FIGS. 1-9, an example embodiment of a fourth flat panel luminaire will be described in connection with FIG. 13 by making reference back to FIGS. 1-9, and an example embodiment of a fifth flat panel luminaire with two and one-piece sensor apparatuses will be described in connection with FIGS. 14-16.

Figure 5:
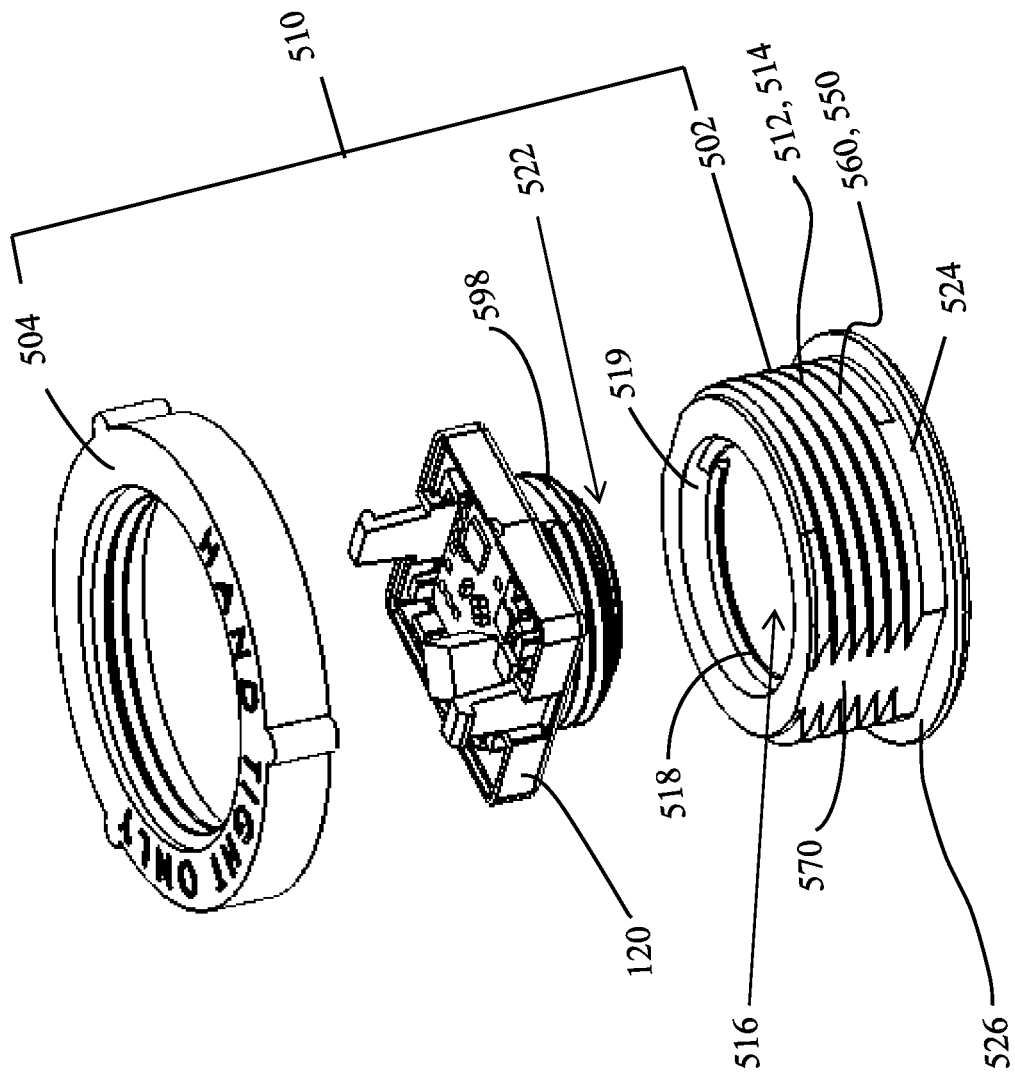
FIG. 5 illustrates a sensor and a sensor mounting apparatus that is configured to mount the sensor to the first example flat panel luminaire of FIG. 1, in accordance with example embodiments of the present disclosure.
Figure 6:
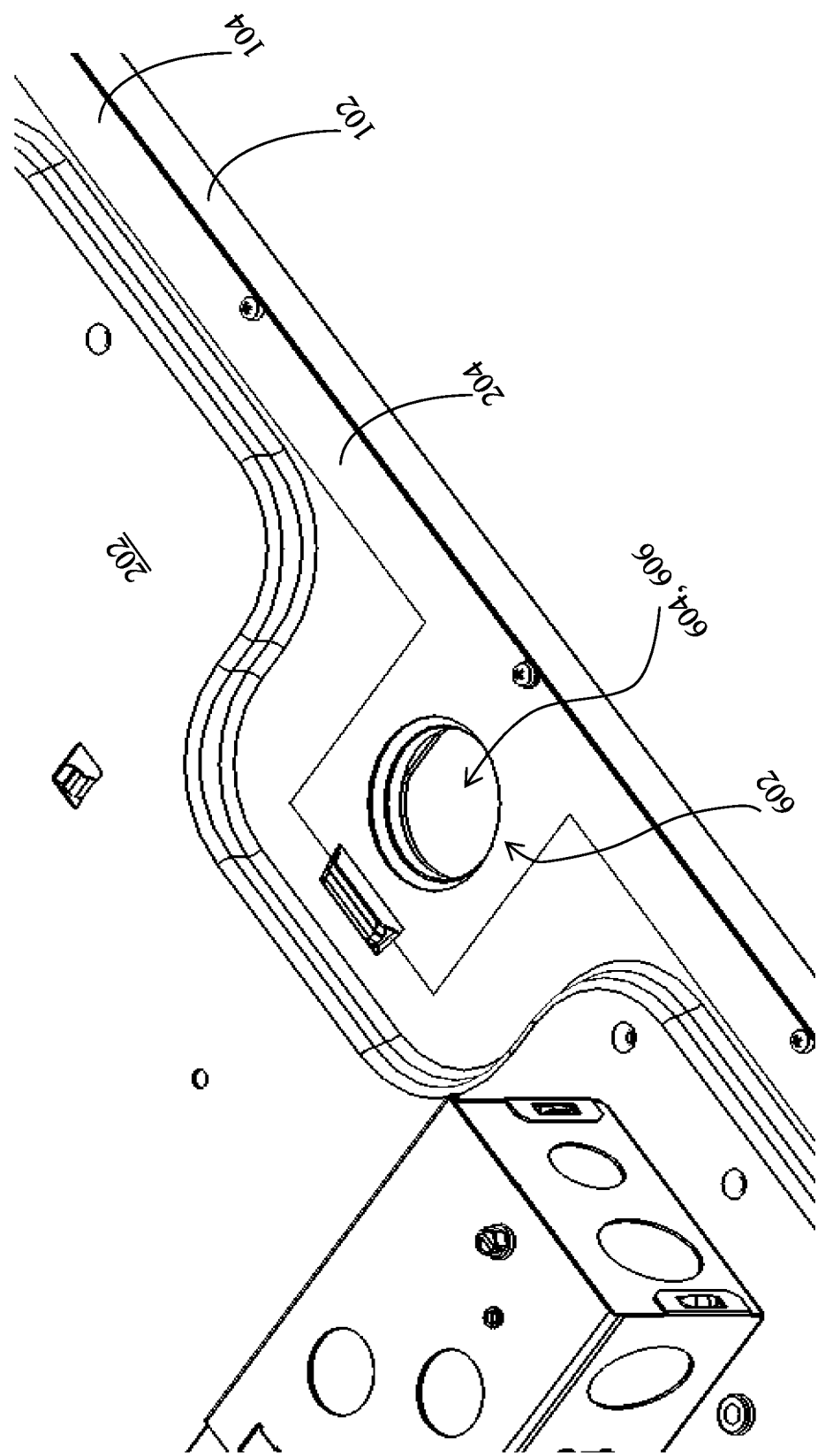
FIG. 6 illustrates the enlarged view of the portion of the top perspective view of the first example flat panel luminaire of FIG. 4 with the sensor and sensor mounting apparatus removed therefrom, in accordance with example embodiments of the present disclosure.
Figure 7:
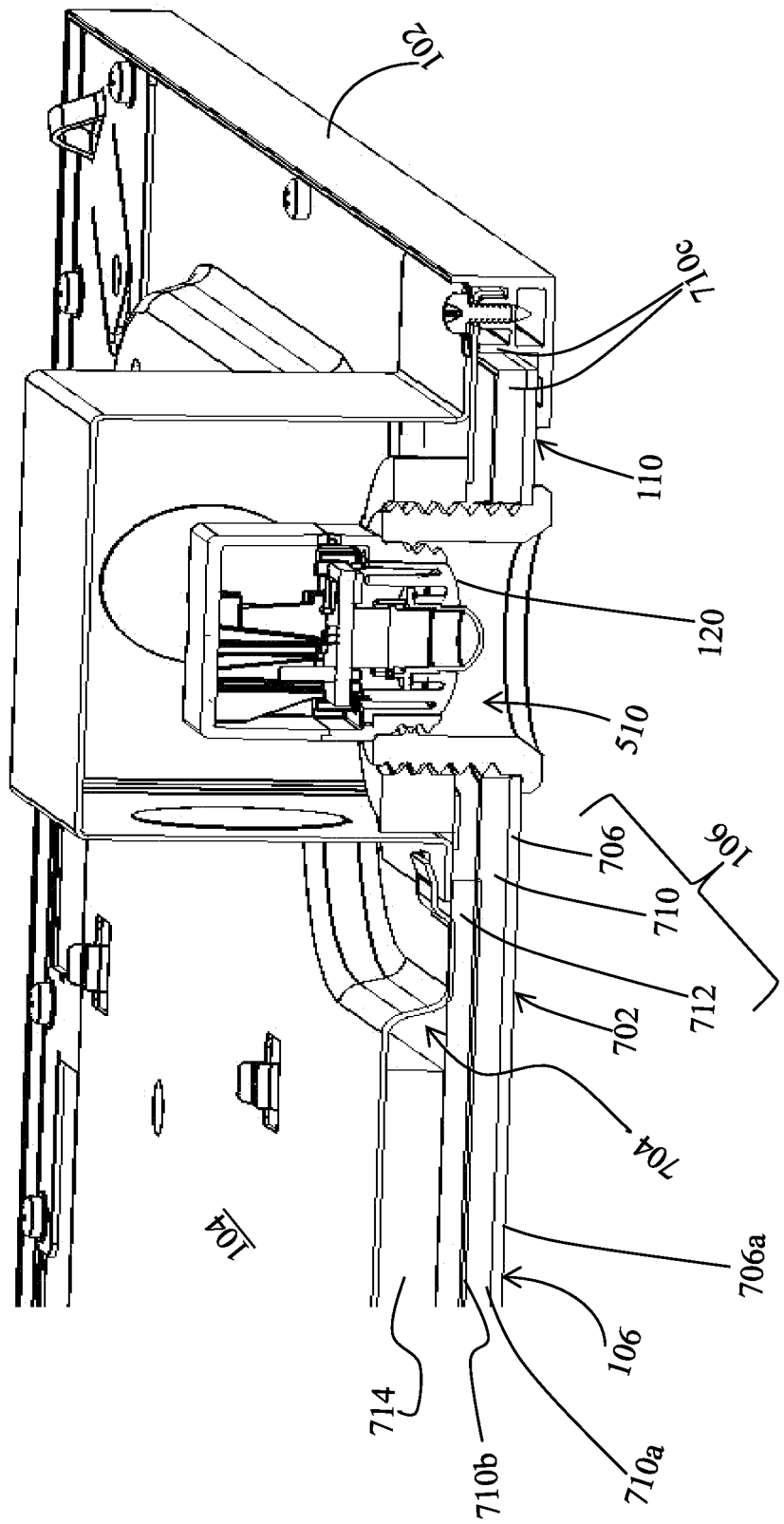
FIG. 7 illustrates a cross-sectional view of a portion of the first example flat panel luminaire of FIG. 1, in accordance with example embodiments of the present disclosure.

Referring to FIGS. 1-9, a flat panel luminaire 100 may include a housing assembly 101 that is configured to house a lighting assembly 702 therein (shown in FIG. 7). In particular, the housing assembly 101 may include a front frame 102 and a back plate 104 that is coupled to the front frame 102 such that they define an internal cavity 704 (shown in FIG. 7). The lighting assembly 702 may be disposed in the internal cavity 704 defined by the housing assembly 101 of the flat panel luminaire 100, and may include an optical assembly 106 and a light source (not shown).

The optical assembly 106 may include a diffuser layer 706, a light guide 710, and a reflector layer 712 that are stacked together such that the light guide 710 is disposed between the reflector layer 712 and the diffuser layer 706. Further, a foam layer 714 may be disposed above the reflector layer 712. In particular, the light source and the optical assembly 106 may be disposed in the internal cavity 704 defined by the housing assembly 101 such that: (a) the diffuser layer 706 faces an opening 110 defined by the front frame 102, (b) the light source is disposed adjacent one or more side edges 710c of the light guide 710, and (c) the foam layer 714 is disposed between the back plate 104 and the reflector layer 712. It should be understood that in other embodiments the optical assembly 106 may vary, for example, by omitting the diffuser layer 706 or moving the reflector layer 712 so that there is a gap between the reflector layer 712 and the light guide 710.

During operation, light from the light source may enter the light guide 710 through the side edge 710c of the light guide 710 (that faces the light source) and may exit the light guide 710 through the major surfaces (710a, 710b) of the light guide 710. Light entering the light guide 710 may be propagated in the light guide 710 via internal reflection from the major surfaces (710a, 710b), traveling from a light-source facing side edge 710c towards an opposing side edge, and illumination light can escape from the light guide 710 through the major surfaces (710a, 710b) and/or the opposing side edge. The major surfaces (710a, 710b) of the light guide 710 may be patterned with microlenses that promote controlled release of light internally incident on those major surfaces (710a, 710b). In other example embodiments, only one of the major surfaces (710a, 710b) may be patterned with microlenses or other features. The microlenses or other features can comprise conical features, truncated cones, convex shapes, or other appropriate features, for example. In particular, a portion of the light that exits through the major surface 710a of the light guide 710 that faces the diffuser layer 706 may pass through the diffuser layer 706 and the opening 110 defined by the front frame 102 and exit to an area to be illuminated. Further, a portion of the light exiting the light guide 710 through the major surface 710b that faces the reflector layer 712 may be reflected back into the light guide 710 to exit through the major surface 710a to the area to be illuminated.

As illustrated in FIGS. 2-4 and 6-9, the back plate 104 may be embossed such that a portion 202 of the back plate 104 is stepped up or raised (herein 'raised portion 202') from a remainder portion 204 (herein 'base portion') of the back plate 104. In one example embodiment, the raised portion 202 may be a continuous portion that is disposed adjacent the center of the back plate 104, while the base portion 204 of the back plate 104 that is not raised may include a peripheral portion of the back plate 104. In other example embodiments such as the one shown in FIG. 13, the back plate 1304 may have multiple raised portions (1302, 1306) formed therein that may be separate from each other. In either case, the raised portion(s) 202 of the back plate 104 may include a plurality of mounting features formed therein, such as through holes, through slots, etc., that are configured to receive fasteners therethrough to couple one or more electronic power supply devices, such as drivers 206, control packs 207, emergency battery packs 208, etc., to the flat panel luminaire 100. The ability to couple one or more electronic power supply devices to the back plate 104 allows different configurations of the flat panel luminaire 100 to be easily assembled on the fly at the factory, i.e., specific electronic power supply devices can be coupled to the embossed back plate 104 or omitted at the factory based on a work order that corresponds to a user requirement.

Figure 10:
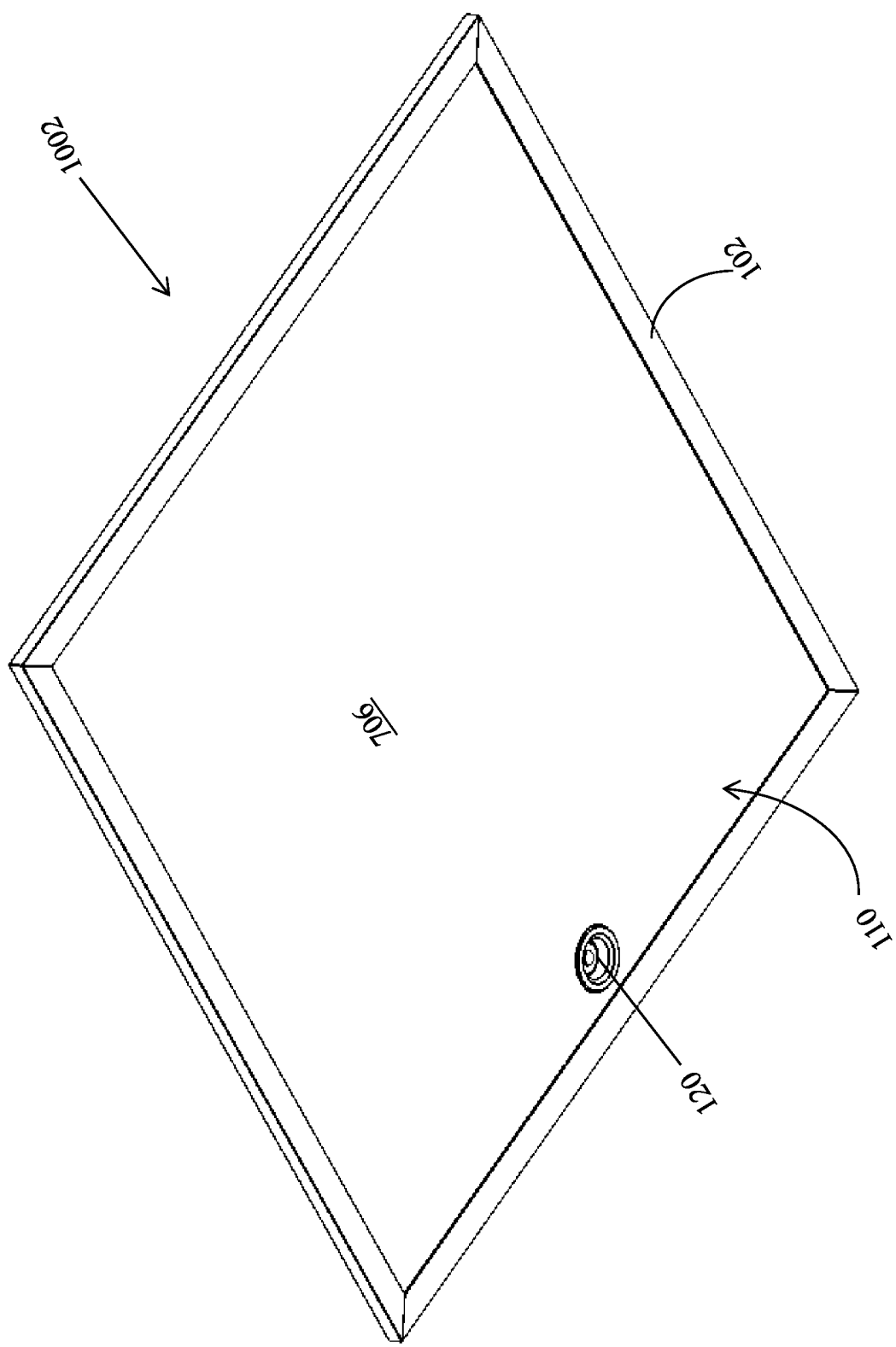
FIGS. 10-11 illustrate a bottom perspective view and a top perspective view of a second example flat panel luminaire, respectively, in accordance with example embodiments of the present disclosure.
Figure 11:
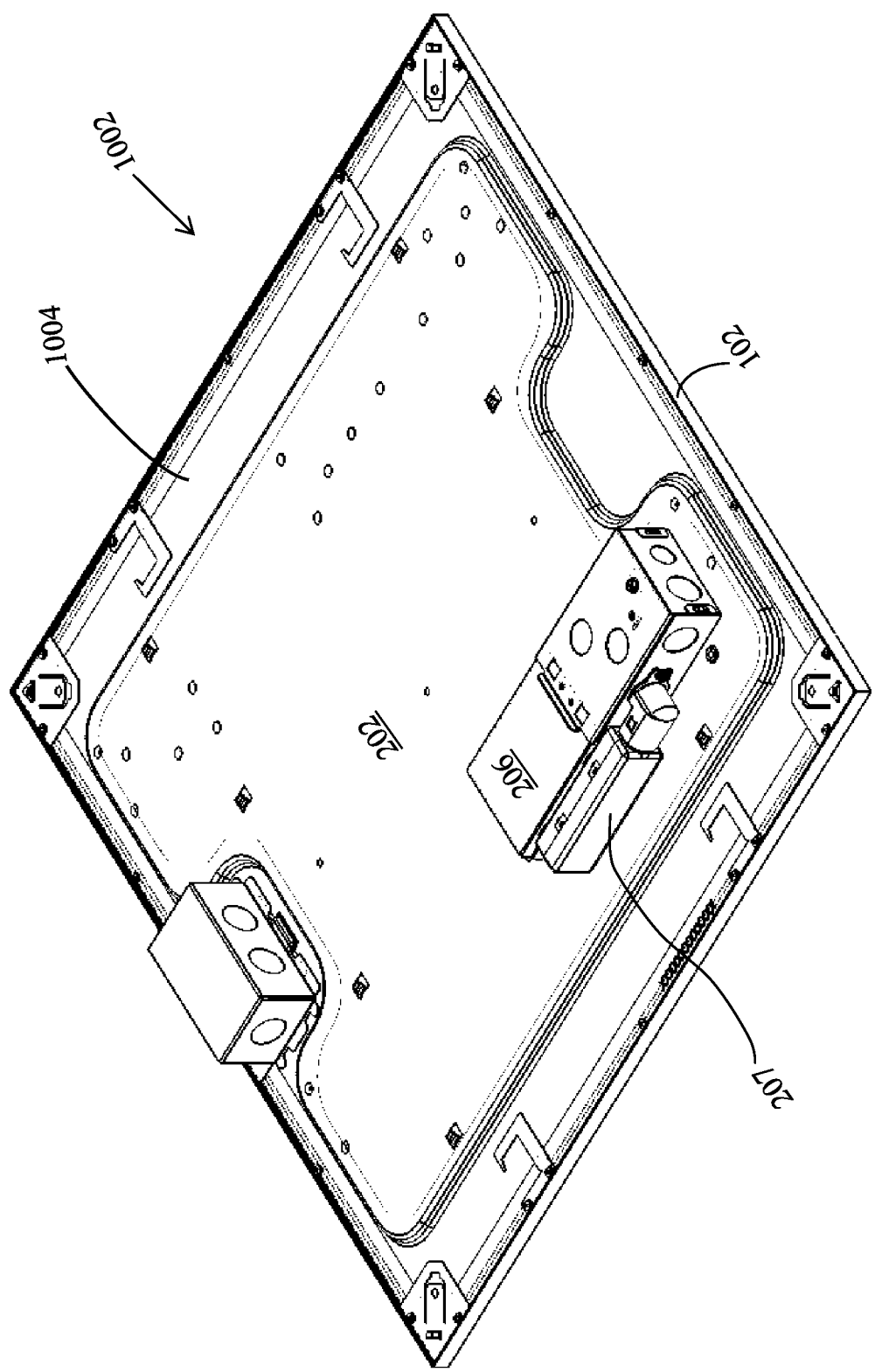

For example, the different configurations of the flat panel luminaire may include a flat panel luminaire 100 with an emergency test switch 124, a sensor 120, an emergency battery pack 208, a driver 206, and a control pack 207 integrated into the flat panel luminaire 100 as illustrated in FIGS. 1-9; or a flat panel luminaire 1002 in which the emergency test switch 124 and a corresponding emergency battery pack 208 is omitted as illustrated in FIGS. 10-11, or other configurations.

Embossing the back plate 104 to form the raised portion (e.g. 202, 1302) provides a gap between optical assembly 106 and the back plate 104 to receive and accommodate a portion of the fasteners that extend through the back plate 104 and into the internal cavity 704 of the housing assembly without engaging and damaging the optical assembly 106, where the fasteners are used to couple the electronic power supply devices to the flat panel luminaire 100. Particularly, in thin flat panel luminaries such as the flat panel luminaire 100 where space within the housing assembly 101 is at a premium, if the back plate is not embossed, there may be very little gap between the back plate and the optical assembly 106 to accommodate portions of the fasteners that extend into the interior cavity 704 defined by the housing assembly without engaging, pressing against, and/or damaging the optical assembly 106. Consequently, if the back plate is not embossed and/or if there isn't sufficient space between the back plate and the optical assembly 106, the electronic power supply devices such as drivers may have to be remotely installed and coupled to the flat panel luminaire using wires that are routed from the drivers to the flat panel luminaire. Therefore, embossing the back plate 104 with raised portions 202, 1302 allows the electronic power supply devices to be integrated with the flat panel luminaire 100 of the present disclosure rather than being maintained separately and installed remote from flat panel luminaire.

Figure 8:
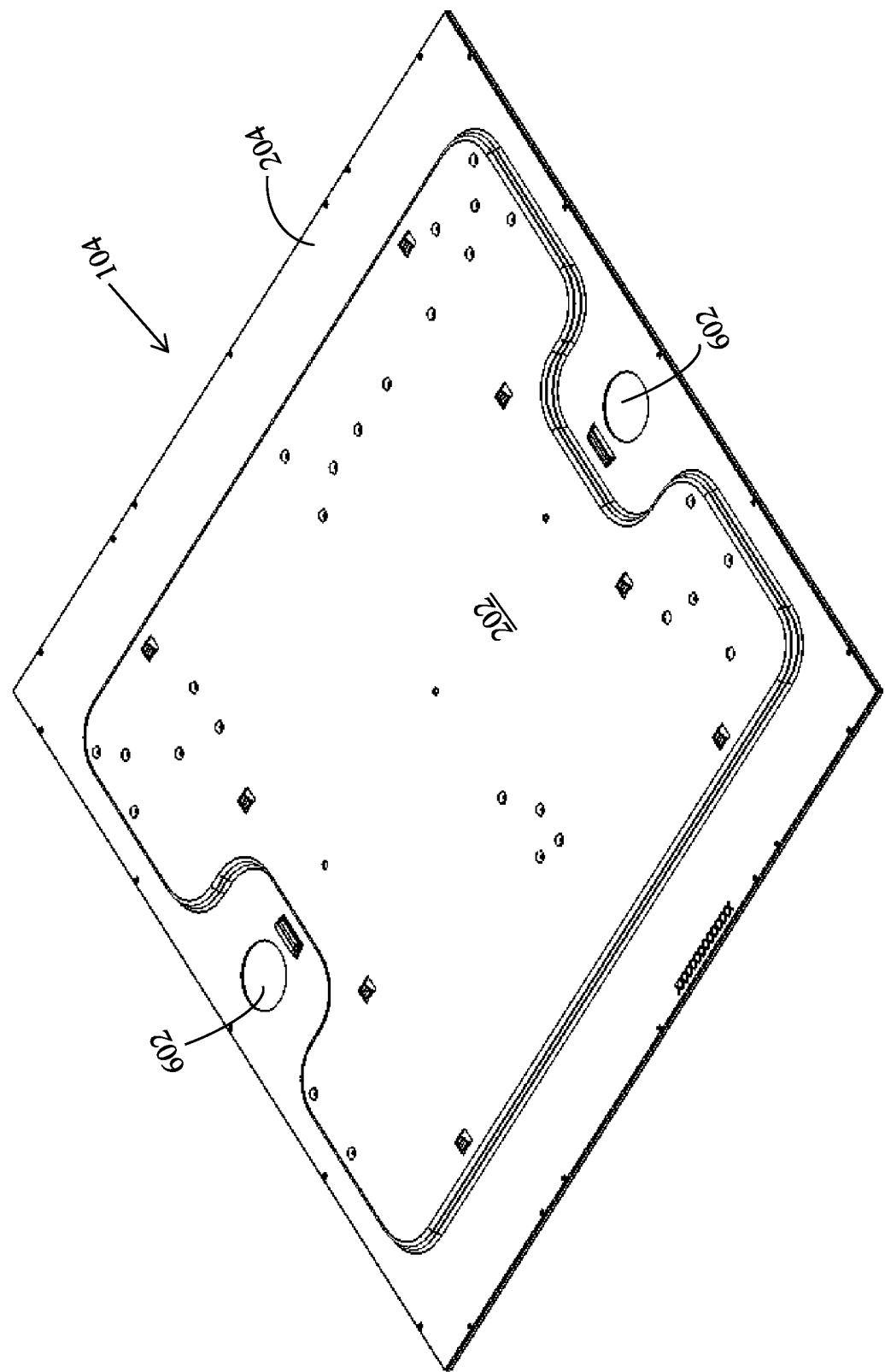
FIGS. 8-9 illustrate a perspective view and a side view of a back plate of the first example flat panel luminaire of FIG. 1, in accordance with example embodiments of the present disclosure.
Figure 9:
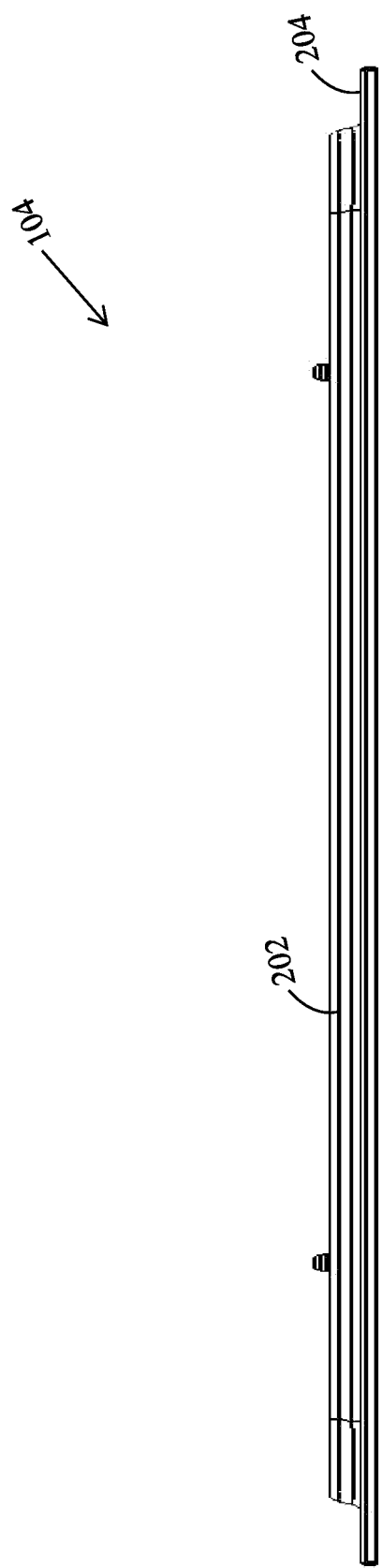

In addition to the embossments formed on the back plate 104, as illustrated in FIG. 8, the back plate 104 may include one or more electronic control device receiving openings 602 formed in the base portion 204 of the back plate 104. The electronic control device receiving openings 602 may be through openings that are configured to integrate electronic control devices, such as sensors 120, emergency test switches 124, etc., to the flat panel luminaire 100 such that the electronic control devices extend through the optical assembly 106 of the flat panel luminaire 100. In the example embodiment illustrated in FIGS. 1-9, the back plate 104 may include two electronic control device receiving openings 602 to integrate the sensor 120 and the electronic test switch 124 to the flat panel luminaire 100. However, in other example embodiments, such as the one illustrated in FIGS. 10-11 where the flat panel luminaire 1002 only includes one electronic control device (e.g., sensor 120), the back plate 1004 may only include one electronic control device receiving opening 602.

As illustrated in FIG. 6, the optical assembly 106 may include one or more electronic device receiving openings 604 formed therein, where the electronic device receiving openings 604 formed in the optical assembly 106 may align with the electronic control device receiving openings 602 of the back plate 104 to receive an electronic device mounting apparatus 510 therethrough to mount an electronic control device to the flat panel luminaire 100 through the optical assembly 106. That is, as illustrated in FIG. 6, the back plate 104 may be coupled to the front frame 102 of the housing assembly 101 and disposed above the optical assembly 106 such that the electronic control device receiving openings 602 of the back plate 104 align with the electronic device receiving openings 604 formed in the optical assembly 106 to form a continuous opening 606 that extends from the back plate 104 through the optical assembly 106. The electronic device receiving openings 604 may be formed by cutting through the different layers (706, 710, and 712) of the optical assembly 106 and/or the foam layer 714), by using any appropriate mechanism, such as laser cutting.

The shape of the electronic control device receiving openings 602 of the back plate 104 may be substantially similar to the shape of the electronic device receiving openings 604 formed in the optical assembly 106. The shape of the electronic control device receiving openings 602 of the back plate 104 and the electronic device receiving openings 604 formed in the optical assembly 106 may be defined based on the shape of the electronic device mounting apparatus (510, 1410, 1610) (shown in FIGS. 5 and 14-16). In particular, the shape of the electronic control device receiving openings 602 of the back plate 104 and the electronic device receiving openings 604 formed in the optical assembly 106 may be configured such that at least a portion of the electronic device mounting apparatus 510 can extend therethrough and fit within the continuous opening 606 formed by the electronic control device receiving openings 602 of the back plate 104 and the electronic device receiving openings 604 in the optical assembly 106.

Figure 14:
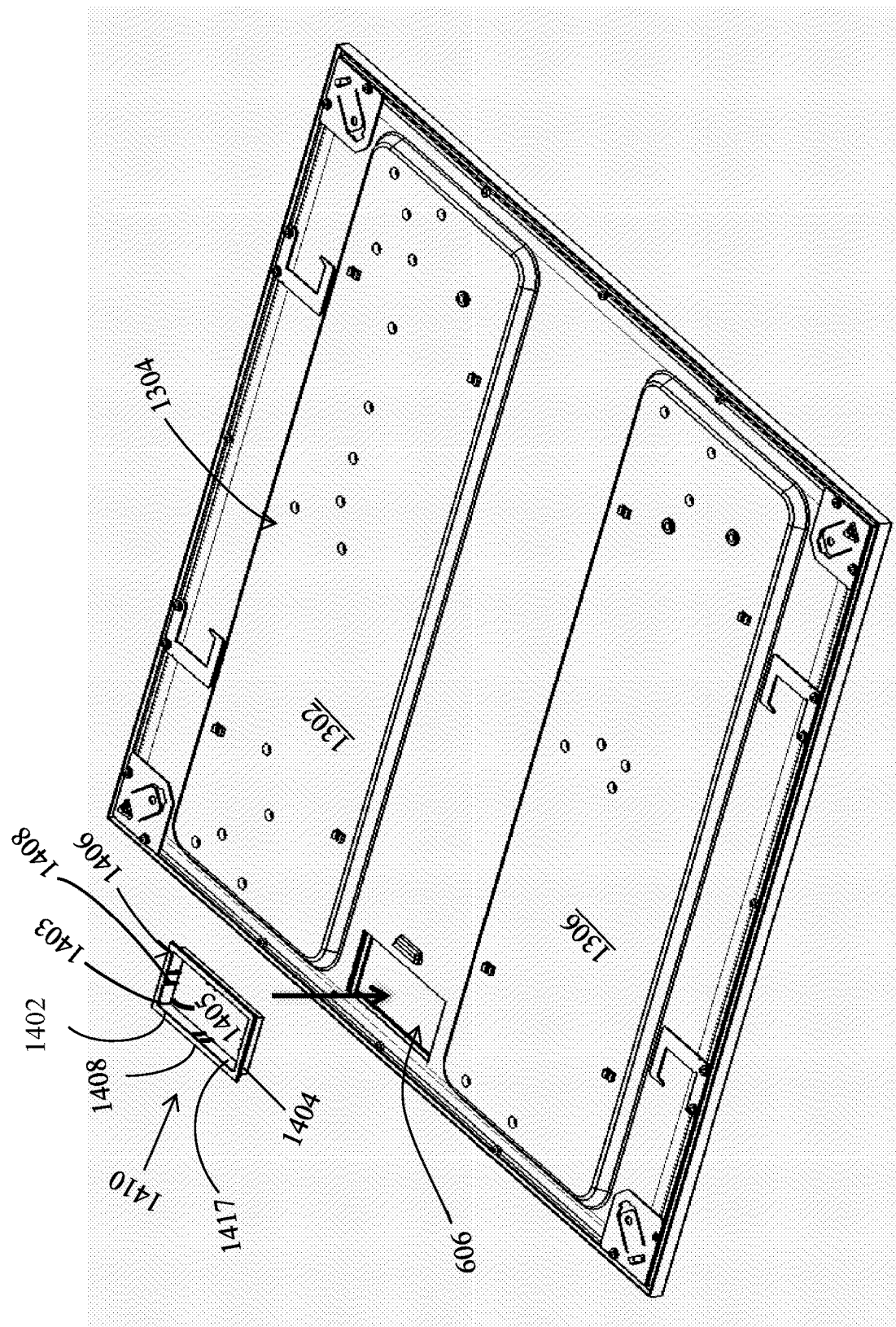
FIG. 14 illustrates an installation of a sensor frame of a two-piece sensor mounting apparatus in a fifth example flat panel luminaire, in accordance with example embodiments of the present disclosure.
Figure 15:
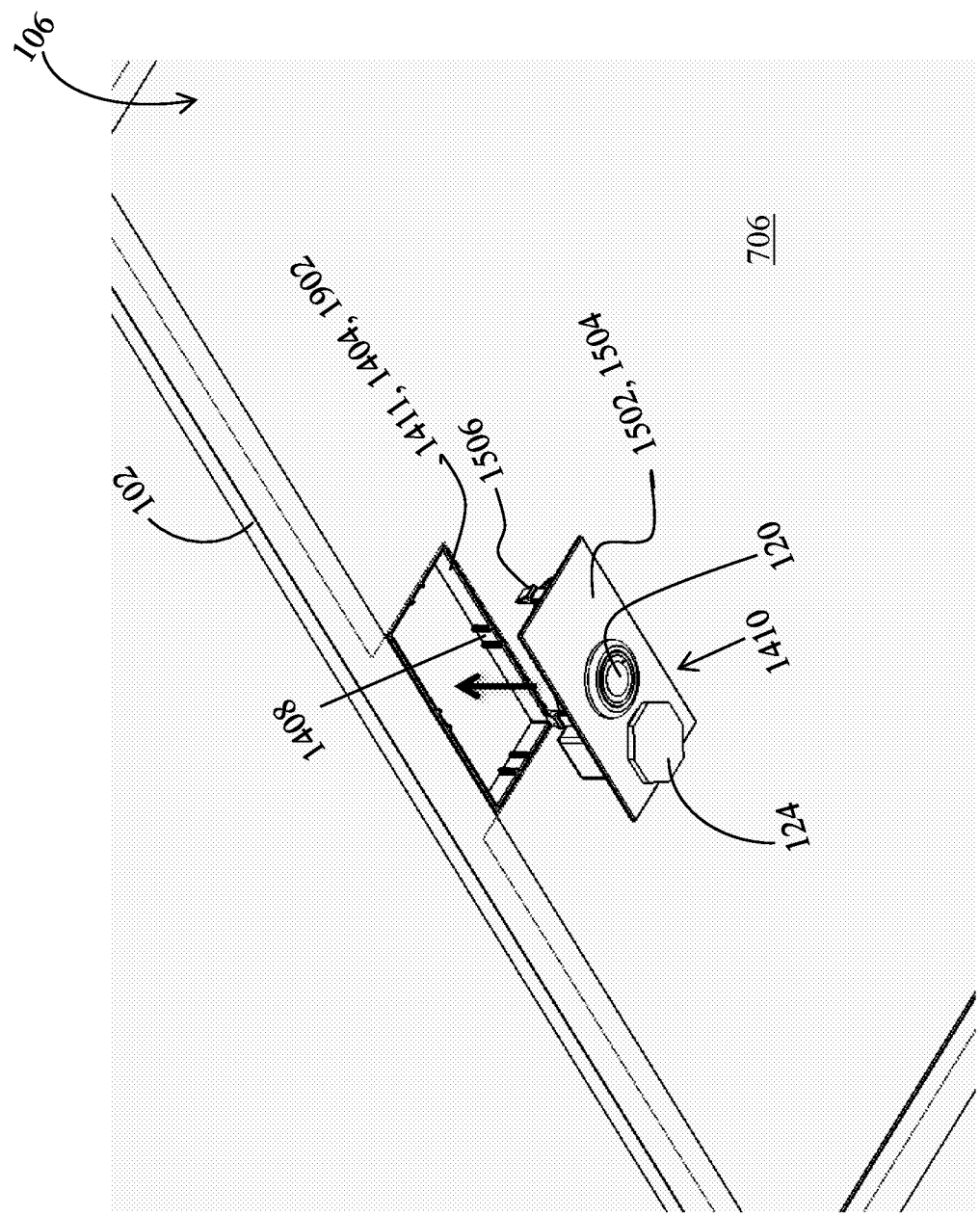
FIG. 15 illustrates an installation of a first snap sensor holder of the two-piece sensor mounting apparatus in the fifth example flat panel luminaire of FIG. 14 having the sensor frame of a two-piece sensor apparatus disposed therein, in accordance with example embodiments of the present disclosure.
Figure 16:
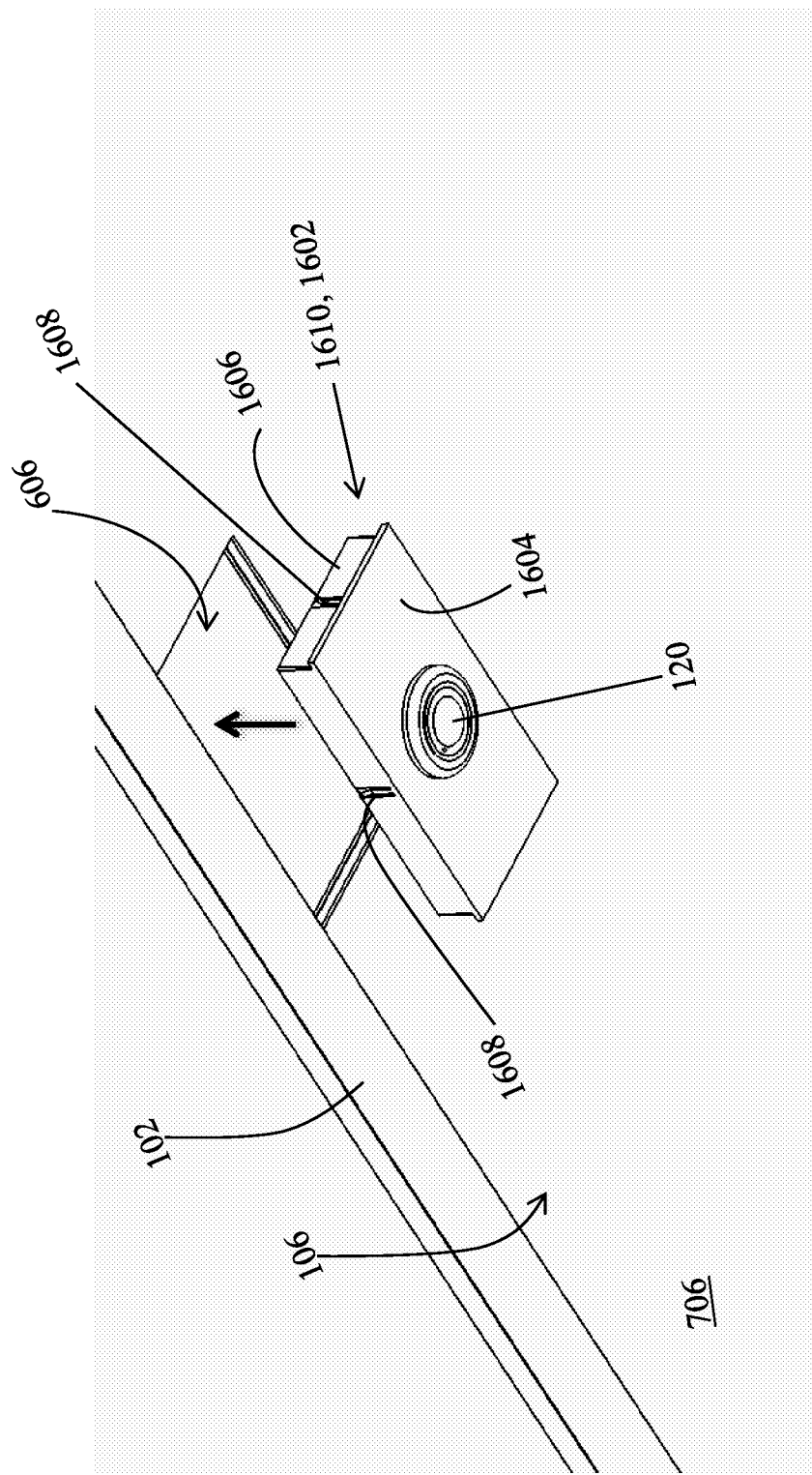
FIG. 16 illustrates an installation of a one-piece sensor mounting apparatus in the fifth example flat panel luminaire of FIG. 14, in accordance with example embodiments of the present disclosure.

For example, in some embodiments such as the ones illustrated in FIGS. 1-9, the electronic control device receiving openings 602 of the back plate 104 and the electronic device receiving openings 604 formed in the optical assembly 106 may be substantially circular to receive a substantially cylindrical electronic device mounting apparatus 510 therein, while, in other embodiments such as the ones in FIGS. 14-16, the electronic control device receiving openings 602 of the back plate 104 and the electronic device receiving openings 604 formed in the optical assembly 106 may be substantially rectangular to receive a substantially rectangular shaped sensor mounting apparatus (1410 or 1610) therein.

The sensor mounting apparatus (510, 1410, 1610) may be configured to hold an electronic control device (e.g., sensors 120, emergency test switch 124, etc.) therein and to mount the electronic control device to the flat panel luminaire 100. As illustrated in FIGS. 1, 7, 10, and 14-16, the sensor mounting apparatus (510, 1410, 1610) may be configured to mount the electronic control device to the flat panel luminaire 100 through the optical assembly 106. The ability to mount the electronic control devices, such as, sensors 120, emergency test switches 124, etc., to the flat panel luminaire 100 through the optical assembly 106 allows electronic control devices to be integrated to the flat panel luminaire 100 with minimal changes to the housing assembly 101 of the flat panel luminaire 100, and particularly, without making changes to the front frame 102 of the housing assembly 101. In other words, mounting the electronic control devices to the flat panel luminaire 100 through the optical assembly 106 allows the electronic control devices to be integrated to the flat panel luminaire 100 without increasing a thickness of the flat panel luminaire 100, i.e., the thickness that extends below the ceiling (determined by height of front frame 102) when the flat panel luminaire 100 is surface mounted. The ability to integrate the electronic control devices to the luminaire without increasing the thickness of the luminaire may be may be essential in the case of thin flat panel luminaries such as the flat panel luminaire 100.

Any increase in the height of the flat panel luminaire 100 by the addition of the electronic power supply devices, such as the drivers 206, control packs 207, emergency battery packs 208, etc., to the back plate 104 may not increase the thickness of the flat panel luminaire that extends below the ceiling when the flat panel luminaire 100 is surface mounted because the electronic power supply devices that are coupled to the back plate 104 may extend through an opening in the ceiling and may be disposed behind the mounting surface.

As illustrated in FIGS. 3-5 and 7, in one example embodiment, the electronic device mounting apparatus 510 may be configured as a screw and lock nut assembly, where the sensor holder member 502 of the electronic device mounting apparatus 510 is designed in the shape of a screw and the holder locking member 504 of the electronic device mounting apparatus 510 is designed as a nut that is configured to be removably coupled to the sensor holder member 502. In particular, the sensor holder member 502 may include a body 512 that extends between an external threaded surface 514 and an internal surface 514 that defines an inner cavity 516. As illustrated in FIG. 5, the external surface 560 of the body 512 is only partially threaded, i.e., only the curved portion 550 of the external surface 560 is threaded while the flat portion 570 of the external surface 560 is not threaded. Further, the sensor holder member 502 may include a flange 526 that extends radially outward from a bottom end 524 of the body 512. Furthermore, the sensor holder member 502 may include inner threads 518 formed on the inner surface 514 and projecting inwards towards the inner cavity 516 from the inner surface 514. The inner threads 518 may be complementary to the threading 598 on the sensor 120 and may be configured to fasten or couple the sensor 120 to the sensor holder member 502. In particular, the sensor 120 may be coupled to the sensor holder member 502 such that the sensor head 522 that comprises the lens of the sensor 120 may be disposed in the inner cavity 516 defined by the sensor holder member 502 while a remainder of the sensor 120 may be disposed external to and above the sensor holder member 502.

To mount the sensor 120 to the flat panel luminaire 100 through the optical assembly 106 of the flat panel luminaire 100, initially, the body 512 of the sensor holder member 502 may be inserted through a continuous opening 606 formed by the electronic control device receiving openings 602 of the back plate 104 and the electronic device receiving openings 604 in the optical assembly 106 of the flat panel luminaire 100 till the flange 526 of the sensor holder member 502 engages a bottom surface 706a of the diffuser layer 706 of the optical assembly 106. Then, the holder locking member 504 may be coupled to and fastened to the sensor holder member 502 such that the optical assembly 106 and the back plate 104 are clamped between the flange 526 of the sensor holder member 502 and the holder locking member 504. Responsively, the sensor 120 may be coupled to and disposed in the sensor holder member 502 as described above.

Similar to the sensor 120, the emergency testing switch 124 and/or other electronic control devices may be mounted to the flat panel luminaire 100 through the optical assembly 106 of the flat panel luminaire 100 using the electronic device mounting apparatus 510 as described above. In some example embodiments, the same sensor holder member 502 of the electronic device mounting apparatus 510 may be used for mounting different electronic control devices. However, in other example embodiments, different sensor holder members 502 may be used for mounting different electronic control devices. That is, in said other example embodiments, different electronic control devices may be integrated to the flat panel luminaire 100 through the optic assembly 106 by changing the sensor holder member 502 of the electronic device mounting apparatus 510 to one that is compatible to the electronic control device to be integrated as needed.

In another example embodiment, the electronic device mounting apparatus (1410, 1610) may be configured as a two-piece apparatus (herein 'two-piece sensor mounting apparatus') as illustrated in FIGS. 14-15 or a one-piece apparatus (herein 'one-piece sensor mounting apparatus') as illustrated in FIG. 16. In particular, the two-piece sensor mounting apparatus 1410 may include a sensor frame 1402 (shown in FIG. 14) and first snap sensor holder 1502 (shown in FIG. 15) that is configured to be coupled to the sensor frame 1402 using a snap fit mechanism. The sensor frame 1402 may include a first side wall 1404 that extends from a top edge 1403 to a bottom edge 1405; and a flange 1406 that extends radially outward from a top edge 1404. The first side wall 1404 of the sensor frame 1402 may include guide rails 1408 that are formed on the inner surface 1411 of the first side wall 1404. Further, the first snap sensor holder 1502 may include a base wall 1504 and snap tabs 1506 that extend substantially perpendicular to the base wall 1504. The base wall 1504 first snap sensor holder 1502 may be configured to support or hold the electronic control devices, such as sensors 120 and emergency test switch 124, etc., such that a portion of the electronic control devices (e.g., sensor lens) may extend through the base wall 1504 and is disposed facing an area to be illuminated while a remainder portion of the electronic control devices is concealed behind the base wall 1504.

To couple the electronic control devices to the flat panel luminaire 100 through the optical assembly 106 using the two-piece sensor mounting apparatus 1410, initially, as illustrated in FIG. 14, the sensor frame 1402 may be inserted through the continuous opening 606 of the flat panel luminaire 100 till the flange 1406 of the sensor frame 1402 engages a back plate 1304 of the flat panel luminaire 100 and the first side wall 1404 of the sensor frame 1402 is disposed in the continuous opening 606. Further, as illustrated in FIG. 14, the first side wall 1404 of the sensor frame 140 may cover the layers of the optical assembly 106 that are exposed to the continuous opening 606 to protect the layers of the optical assembly 106 from any damage that may result from inserting the first snap sensor holder 1502 through the continuous opening 606. Then, as illustrated in FIG. 15, the first snap sensor holder 1502 may be inserted through the continuous opening 606 of the flat panel luminaire 100 by guiding the snap tabs 1506 via the guide rails 1408 formed on the inner surface 1410 of the first side wall 1404 of the sensor frame 1402. The first snap sensor holder 1502 may be inserted through the continuous opening 606 till the snap tabs 1506 snap onto and engage the flange 1406 of the sensor frame 1402 that is disposed on the back plate 104. The flange

1406 may provide additional rigid support for receiving and engaging the snap tabs 1506 of the first snap sensor holder 1502.

Referring to FIG. 16, the one-piece sensor mounting apparatus 1610 may not include the sensor frame 1402 as in the two-piece sensor mounting apparatus 1410. Instead, the one-piece sensor mounting apparatus 1610 may include a second snap sensor holder 1602 that has a base wall 1604 and a second side wall 1606 that is offset from the periphery of the base wall 1604 and extends substantially perpendicular to the base wall 1604. Similar to the two-piece sensor mounting apparatus 1410, the base wall 1604 of the second snap sensor holder 1602 may be configured to support or hold the electronic control devices, such as sensors 120 and emergency test switch 124, etc., such that a portion of the electronic control devices (e.g., sensor lens) may extend through the base wall 1604 and is disposed facing an area to be illuminated while a remainder portion of the electronic control devices is concealed behind the base wall 1604. Further, the snap sensor holder 1602 may include snap tabs 1608 formed on the second side wall 1604 as illustrated in FIG. 16, where the snap tabs 1608 are configured to engage the back plate 104 of the flat panel luminaire 100 to securely retain the second snap sensor holder 1602 and the electronic control devices disposed thereon within the continuous opening 606 of the flat panel luminaire 100.

As illustrated in FIGS. 14-16 and as described above, the two-piece sensor mounting apparatus 1410 and the one-piece sensor mounting apparatus 1610 may be substantially rectangular in shape. The substantially rectangular shape of the two-piece sensor mounting apparatus 1410 and the one-piece sensor mounting apparatus 1610 may allow more than one electronic control devices to be mounted to the flat panel luminaire using a single sensor mounting apparatus (1410, 1610). In contrast, the electronic device mounting apparatus 510 illustrated in FIG. 5 may allow only one electronic control device to be mounted to the flat panel luminaire per electronic device mounting apparatus 510. However, the screw and nut configuration of the electronic device mounting apparatus 510 of FIG. 5 allows the electronic device mounting apparatus 510 to be coupled to flat panel luminaries of different thicknesses, thereby eliminating a need to maintain different sensor mounting apparatuses for different thicknesses of a flat panel luminaire.

The flat panel luminaire 100 may further include wire routing covers 250 that are coupled to the back plate 104 and disposed over the electronic control devices integrated to the flat panel luminaire 100. The wire routing covers 250 may include knockouts that can be removed to create an opening for routing wires to the electronic control devices. Further, even though FIGS. 1-11 and 13-16 illustrate flat panel luminaries that have a substantially square profile, one of skill in the art can understand and appreciate that in other example embodiments, the flat panel luminaire can have any other appropriate shape, such as a flat panel luminaire 1200 that has a rectangular profile as illustrated in FIG. 12 without departing from a broader scope of the present disclosure.

The technology of the flat panel luminaire with the integrated electronic devices may be embodied in many different forms and should not be construed as being limited to the embodiments set forth herein; rather, these embodiments are provided so that this disclosure will be thorough and complete, and will fully convey the scope of the technology to those appropriately skilled in the art. Further, even though the present disclosure describes a flat panel luminaire, one of skill in the art can understand and appreciate that in other example embodiments, any other appropriate luminaries having features corresponding to the back plate and the light guide based optic assembly may be used without departing from a broader scope of the present disclosure.

The flat panel luminaire (or components thereof) and/or the sensor mounting apparatus described herein can be made of one or more of a number of suitable materials to allow the flat panel luminaire, the mounting assembly, and/or other associated components to meet certain standards and/or regulations while also maintaining durability in light of the one or more conditions under which the mounting system and/or other associated components of the system can be exposed. Examples of such materials can include, but are not limited to, plastic, PVC, aluminum, stainless steel, copper, fiberglass, ceramic, etc.

Further, components of the flat panel luminaire (or portions thereof) described herein can be made from a single piece (as from a mold, injection mold, die cast, or extrusion process). In addition, or in the alternative, components of the mounting system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of the mounting system. In the following detailed description of the example embodiments, numerous specific details are set forth in order to provide a more thorough understanding of the present disclosure. However, it will be apparent to one of ordinary skill in the art that the flat panel luminaire of the present disclosure may be practiced without these specific details. In other instances, well-known features have not been described in detail to avoid unnecessarily complicating the description.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A luminaire comprising:
   a housing assembly that comprises a back plate;
   a lighting assembly disposed in an internal cavity of the housing assembly, the lighting assembly comprising a light source and an optical assembly that are arranged such that light from the light source enters a light guide of the optical assembly through a side edge of the light guide and exits the light guide through a major surface of the light guide, wherein the major surface is substantially perpendicular to the side edge of the light guide;
an electronic power supply device integrated into the luminaire by coupling the electronic power supply device to the back plate; and
an electronic control device mounted into the luminaire through the optical assembly.

2. The luminaire of claim 1:
wherein the back plate comprises a mounting feature to mount the electronic power supply device to the back plate, and
wherein the back plate comprises an electronic control device receiving opening formed therein, the electronic control device receiving opening configured to receive an electronic device mounting apparatus therethrough to mount the electronic control device to the luminaire through the optical assembly.

3. The luminaire of claim 1, wherein the optical assembly comprises a through opening formed therein, wherein the through opening receives an electronic device mounting apparatus to mount the electronic control device to the luminaire through the optical assembly.

4. The luminaire of claim 1, wherein the optical assembly comprises a diffuser layer, the light guide, and a reflector layer such that the light guide is disposed between the diffuser layer and the reflector layer.

5. The luminaire of claim 1, wherein the luminaire is a flat panel luminaire.

6. The luminaire of claim 1, wherein the electronic power supply device comprises at least one of a driver, an emergency battery pack, and a control pack.

7. The luminaire of claim 1, wherein the electronic control device comprises at least one of a sensor and an emergency test switch.

8. The luminaire of claim 3, wherein the electronic device mounting apparatus comprises:
a sensor holder member configured to hold the electronic control device therein; and
a holder locking member that is configured to be removably coupled to the sensor holder member and securely retain the sensor holder member to the luminaire such that the optical assembly and the back plate are clamped between the holder locking member and a portion of the sensor holder member.

9. The luminaire of claim 3, wherein the electronic device mounting apparatus is configured as a screw and a nut assembly.

10. The luminaire of claim 8, wherein the sensor holder member comprises:
a body comprising an outer surface that is partially threaded and an inner surface defining an inner cavity, the inner cavity configured to receive a portion of the electronic control device therethrough; and
internal threads on the inner surface of the body and configured to mate with complementary threads on the electronic control device to couple the electronic control device to the sensor holder member.

11. The luminaire of claim 10, wherein the electronic device mounting apparatus is coupled to the flat panel luminaire such that:
the body of the sensor holder member extends through the optical assembly and the back plate, and
the optical assembly and the back plate are clamped between a flange of the sensor holder member and the holder locking member of the electronic device mounting apparatus.

12. A luminaire comprising:
a housing assembly comprising a back plate with mounting features for receiving an electronic power supply device;
a light assembly disposed in an internal cavity of the housing assembly, the light assembly comprising a light source and an optical assembly; and
an electronic control device mounting apparatus mounted through the optical assembly and that receives an electronic control device.

13. The luminaire of claim 12, wherein the back plate comprises an electronic device receiving opening that is aligned with a through opening formed in the optical assembly, wherein the electronic control device mounting apparatus is disposed in the electronic device receiving opening of the back plate.

14. The luminaire of claim 12, wherein the electronic control device mounting apparatus comprises:
a sensor holder member that is configured to hold the electronic control device therein; and
a holder locking member that is configured to be removably coupled to the sensor holder member.

15. The luminaire of claim 12, wherein the electronic control device mounting apparatus is configured as a screw and a nut assembly.

16. The luminaire of claim 14, wherein the sensor holder member comprises:
a body comprising an outer surface that is partially threaded and an inner surface that defines an inner cavity, the inner cavity configured to receive a portion of the electronic control device therethrough; and
internal threads on the inner surface of the body.

17. The luminaire of claim 16, wherein the electronic control device mounting apparatus is coupled to the flat panel luminaire such that:
the body of the sensor holder member extends through the optical assembly and the back plate; and
the optical assembly and the back plate are clamped between a flange of the sensor holder member and the holder locking member of the electronic control device mounting apparatus.

18. The luminaire of claim 12, wherein the electronic power supply device comprises at least one of a driver, an emergency battery pack, and a control pack.

19. The luminaire of claim 12, wherein the electronic control device comprises at least one of a sensor and an emergency test switch.

20. The luminaire of claim 12, wherein the optical assembly comprises a light guide and a reflector layer.

* * * * *